United States Patent
Kawasaki et al.

(10) Patent No.: US 12,220,682 B2
(45) Date of Patent: Feb. 11, 2025

(54) COMPOSITE AGGREGATE PARTICLES, ADSORBENT USING SAME, MOLDED BODY AND WATER PURIFIER

(71) Applicant: KURARAY CO., LTD., Kurashiki (JP)

(72) Inventors: Shuji Kawasaki, Okayama (JP); Shuji Matsunaga, Tokyo (JP); Tetsuya Hanamoto, Okayama (JP); Hiroe Yoshinobu, Okayama (JP)

(73) Assignee: KURARAY CO., LTD., Kurashiki (JP)

( * ) Notice: Subject to any disclaimer, the term of this patent is extended or adjusted under 35 U.S.C. 154(b) by 648 days.

(21) Appl. No.: 17/441,744

(22) PCT Filed: Mar. 25, 2020

(86) PCT No.: PCT/JP2020/013482
§ 371 (c)(1),
(2) Date: Sep. 22, 2021

(87) PCT Pub. No.: WO2020/203587
PCT Pub. Date: Oct. 8, 2020

(65) Prior Publication Data
US 2022/0219137 A1   Jul. 14, 2022

(30) Foreign Application Priority Data
Mar. 29, 2019 (JP) ................. 2019-065652

(51) Int. Cl.
| | |
|---|---|
| *B01J 20/18* | (2006.01) |
| *B01J 20/20* | (2006.01) |
| *B01J 20/26* | (2006.01) |
| *B01J 20/28* | (2006.01) |
| *C02F 1/28* | (2023.01) |
| *C02F 101/12* | (2006.01) |
| *C02F 101/20* | (2006.01) |
| *C02F 101/36* | (2006.01) |

(52) U.S. Cl.
CPC .............. *B01J 20/18* (2013.01); *B01J 20/20* (2013.01); *B01J 20/261* (2013.01); *B01J 20/28004* (2013.01); *B01J 20/28076* (2013.01); *C02F 1/288* (2013.01); *B01J 2220/46* (2013.01); *C02F 1/281* (2013.01); *C02F 1/283* (2013.01); *C02F 1/285* (2013.01); *C02F 2101/12* (2013.01); *C02F 2101/20* (2013.01); *C02F 2101/36* (2013.01); *C02F 2201/006* (2013.01)

(58) Field of Classification Search
CPC .......... B01D 35/00; B01J 20/16; B01J 20/18; B01J 20/20; B01J 20/26; B01J 20/261; B01J 20/28; B01J 20/28004; B01J 20/28023; B01J 20/28026; B01J 20/2803; B01J 20/28076; B01J 2220/46; C02F 1/281; C02F 1/283; C02F 1/285; C02F 1/288; C02F 1/42; C02F 2101/12; C02F 2101/20; C02F 2101/36; C02F 2201/006
See application file for complete search history.

(56) References Cited

U.S. PATENT DOCUMENTS

2006/0163151 A1   7/2006   Kawasaki et al.

FOREIGN PATENT DOCUMENTS

| | | |
|---|---|---|
| JP | 2003334544 A | 11/2003 |
| JP | 2005125199 A | 5/2005 |
| JP | 4361489 B2 | 11/2009 |
| WO | WO-2004039494 A1 | 5/2004 |
| WO | WO-2006082898 A1 | 8/2006 |
| WO | WO-2017030041 A1 | 2/2017 |
| WO | WO-2018181659 A1 | 10/2018 |

OTHER PUBLICATIONS

International Search Report issued Jun. 16, 2020 in PCT/JP2020/013482, 2 pages.

*Primary Examiner* — Brian A McCaig
(74) *Attorney, Agent, or Firm* — Element IP, PLC

(57) ABSTRACT

An aspect of the present invention relates to composite aggregate particles, which include a fine particle compound (a1) containing at least either an amorphous titanosilicate compound or an aluminosilicate compound, and a plastic powder (a2). The plastic powder (a2) is attached to at least a part of the surface of the fine particle compound (a1). The pore volume and the average particle size D50 of the composite aggregate particles satisfy the following formula: pore volume (ml/g)≥0.0010×D50 (μm)+1.60.

17 Claims, No Drawings

COMPOSITE AGGREGATE PARTICLES, ADSORBENT USING SAME, MOLDED BODY AND WATER PURIFIER

TECHNICAL FIELD

The present invention relates to composite aggregate particles and an adsorbent, a molded body, and a water purifier that are obtained using the composite aggregate particles.

BACKGROUND ART

Activated carbon has excellent ability to adsorb various contaminants, and has been hitherto used as an adsorbent in various fields for home use and industrial use. Inn recent years, there has been a demand for delicious water that does not have chlorine odor or musty odor, and various water purifiers have been proposed in response to this demand. However, there has been recently increasing concern about trihalomethane (hereinafter abbreviated as THM), endocrine disrupters, heavy metals and the like related to water quality in terms of safety and health. In order to meet these demands, it is not sufficient to use activated carbon singly and it is necessary to use other adsorbents such as inorganic compounds having peculiar adsorbing ability concurrently.

The present applicants have so far carried out research and development of a titanosilicate-based inorganic compound, a composite powder body in which a plastic powder is attached to an aluminosilicate-based inorganic compound, and a composite adsorbent containing a composite powder body and an adsorptive substance (Patent Literature 1). The composite adsorbent has a low liquid passing resistance and exhibits an excellent effect of maintaining the performance of removing free chlorine, THM, heavy metals and the like in a well-balanced manner.

Meanwhile, especially in the field of water purification, load ion among heavy metals is prescribed as a substance suspected of having an endocrine disrupting effect by the Environment Agency and the prescribed value thereof is set. Hence, the development of a more effective adsorbent for this lead ion is required.

Accordingly, an object of the present invention is to provide a material for adsorbent that is capable of more efficiently removing lead ion while maintaining the excellent performance of a composite adsorbent as described above.

CITATION LIST

Patent Literature

Patent Literature 1: IP 4,361,489 B2

SUMMARY OF INVENTION

As a result of diligent studies to solve the above-mentioned problems, the present inventors have found out that the above-mentioned problems can be solved by composite aggregate particles having the following configuration, and have further repeatedly carried out research based on the finding to complete the present invention.

The composite aggregate particles according to an aspect of the present invention are composite aggregate particles which contain a fine particle compound (a1) containing at least either of an amorphous titanosilicate compound or an aluminosilicate compound, and a plastic powder (a2), wherein the plastic powder (a2) is attached to at least a part of a surface of the fine particle compound (a1), and a pore volume and an average particle size D50 of the composite aggregate particles satisfy the following formula.

Pore volume (ml/g)≥0.0010×D50 (μm)+1.60

DESCRIPTION OF EMBODIMENTS

Hereinafter, embodiments of the present invention wilt be described in detail with reference to specific examples and the like, but the present invention is not limited thereto.

<Composite Aggregate Particles>

The composite aggregate particles of the present embodiment are composite aggregate particles which contain a fine particle compound (a1) containing at least either of an amorphous titanosilicate compound or an aluminosilicate compound, and a plastic powder (a2), wherein the plastic powder (a2) is attached to at least a part of a surface of the fine particle compound (a1), and a pore volume and an average particle size D50 of the composite aggregate particles satisfy the following formula.

Pore volume (ml/g)≥0.0010×D50 (μm)+1.60.

By forming composite aggregate particles having such a configuration into an adsorbent, it is possible to provide a water purifier and the like that have low liquid passing resistance and significantly excellent lead ion removing performance while being capable of sufficiently exerting the performance of removing free chlorine, THM, heavy metals and the like.

In the present embodiment, the average particle size D50 means the 50% particle size in the volume-based cumulative distribution. The numerical value of this average particle size D50 is a value measured by the laser diffraction/scattering method. The average particle size D50 can be measured using, for example, a wet particle size distribution measuring instrument (MICROTRAC MT3300EX II manufactured by MicrotracBEL Corp.) described later.

In the present embodiment, the composite aggregate particles are not particularly limited as long as they are a composite in which the plastic powder (a2) is attached to at least a part of the surface of the fine particle compound (a1). However, the composite aggregate particles may be, for example, in a form so that the plastic powder (a2) is attached to at least a part of the surface of the fine particle compound (a1) to bond the fine particle compounds (a1) to each other.

As the fine particle compound (a1) of the present embodiment, an amorphous titanosilicate compound or aluminosilicate compound having a large ion exchange capacity and high selectivity for heavy metals is used. These may be used singly or concurrently.

As the amorphous titanosilicate compound, for example, the product name AFS that is commercially available from BASF SE can be used. As the aluminosilicate compound, an A-type or X-type aluminosilicate compound is suitable from the viewpoint of large ion exchange capacity. The product name "Zeomic" that is commercially available from Sinanen Zeomic Co., Ltd. and the like are known.

Examples of the plastic powder (a2) used in the present embodiment include powders of various thermoplastic resins such as polyethylene, polypropylene, polystyrene, ethylene vinyl acetate copolymer, acrylonitrile butadiene styrene, polyesters such as polyethylene terephthalate, polybutylene terephthalate, and polymethyl methacrylate, and polyamide such as nylon, and thermosetting resins such as furan resin and phenol resin. Among these, a powder of a thermoplastic resin can be preferably used from the viewpoint that aggregate particles can be formed by heating. Among these thermoplastic resins, polyethylene is the most preferable.

When a thermoplastic resin powder having a too small melt flow rate (MFR) is used, the fine particle compound is not easily attached to the surface of the thermoplastic resin in some cases. On the other hand, when a thermoplastic resin powder having a too large melt flow rate (MFR) is used, the thermoplastic resin cannot retain the shape of particles but flows when being heated to a temperature equal to or more than the melting point in some cases. Hence, it is preferable to use a thermoplastic resin powder having a MFR of 0.02 g/10 minutes or more and 40 g/10 minutes or less. MFR is the exit velocity of a thermoplastic resin extruded from an orifice having prescribed diameter and length at constant temperature and pressure, and is specifically measured in conformity to JIS K 7210 (2014).

For the composite aggregate particles of the present embodiment, it is first necessary to attach the plastic powder (a2) to the fine particle compound (a1). The fine particle compound (a1) may be in the form of powder or granules, but the average particle size D50 of the fine particle compound (a1) is preferably 2.00 µm or less, preferably 100 µm or less since the adsorption rate when the fine particle compound (a1) is formed into a composite adsorbent tends to be slow in a case where the particle size is too large. In particular, it is desirable that the average particle size D50 is 3 µm to 80 µm from the viewpoint of support retention.

The particle size of the plastic powder (a2) used in the present embodiment is related to the particle size of the fine particle compound (a1), and a large plastic powder may be selected when a large fine particle compound (a1) is used and a small plastic powder may be selected when a small fine particle compound (a1) is used. From this point of view, it is desirable that the average particle size D50 of the plastic powder is 0.1 µm to 200 µm, preferably 1 µm to 100 µm.

In order to attach the plastic powder (a2) to the fine particle compound (a1), means, for example, far-infrared heating and a heating and drying furnace can be used. The attachment in the present embodiment means all states in which the fine particle compound and the plastic powder are firmly fixed to each other such as heat fusion by melting and heating in addition to bonding using an adhesive and the like, but attachment by heat fusion is preferable from the viewpoint of reliable fixing.

More specifically, for example, a mixture is obtained by uniformly mixing the plastic powder (a2) with the fine particle compound (a1) so as to have a content of 3 to 40 mass %, this mixture is heated to a temperature equal to or more than the melting point of the plastic powder, and crashed before being cooled, and sieving is performed to obtain composite aggregate particles in which the pore volume and average particle size (D50) of the composite aggregate particles satisfy the following formula:

pore volume (ml/g)≥0.0010×D50 (µm)+1.60.

The content of plastic powder (a2) in the composite aggregate particles can also be estimated by measuring the volatile matter content. The measurement of volatile matter content is performed by a method in which a sample dried at 110° C. for 3 hours is first weighed at room temperature, then is left in a furnace at 930° C. for 7 minutes in a state of being placed in a porcelain crucible and covered, and cooled, and the mass of the residual sample is then measured. Since the plastic powder (a2) decomposes and volatilizes at this temperature, the lost weight is taken as the content of the plastic powder (a2).

After sieving, particles smaller than a predetermined sieving standard can be reused. The average particle size D50 of the composite aggregate particles is preferably 50 µm or more and 1 mm or less, more preferably 75 µm or more and 500 µm or less from the viewpoint of pressure loss and handleability.

In the composite aggregate particles of the present embodiment, as the pore volume and D50 are set so as to satisfy the formula:

pore volume (ml/g)≥0.0010×D50 (µm)+1.60, it is estimated that the contact frequency of composite aggregate particles with water per unit volume increases and the adsorption performance originally possessed by the fine particle compound can be more effectively utilized. Hence, the composite aggregate particles of the present embodiment have significantly high lead ion removing performance.

The methods for measuring the particle size distribution and the pore volume in the present embodiment are as follows.

(Particle Size Distribution)

The particle sizes of the fine particle compound (a1), plastic powder (a2), and composite aggregate particles are measured by a laser diffraction measurement method. A dispersion in which a substance to be measured, a surfactant, and ion exchanged water are mixed together is measured by a penetration method using a laser diffraction/scattering type particle size distribution measuring instrument ("MT33.00 II" manufactured by MicrotracBEL Corp.). The dispersion concentration is adjusted so as to fall in the measurement concentration range displayed by the same instrument. As the surfactant at the time of dispersion preparation, "polyoxyethylene(10) octyl phenyl ether" manufactured by FUJIFILM Wako Pure Chemical Corporation is used and an appropriate amount thereof is added so that bubbles, which affect the measurement, are not generated. The analysis conditions are presented below.

(Analysis Conditions)

Number of measurements; 1 time
Measurement time; 30 seconds
Distribution display; volume
Particle size sorting; standard
Calculation mode; MT3000 II
Solvent name; WATER
Upper limit of measurement; 2000 µm, lower limit of measurement; 0.021 µm
Residual ratio; 0.00
Passing material ratio; 0.00
Residual ratio setting; invalid
Particle penetration; penetrated
Refractive index of particles; 1.81
Particle shape; non-spherical
Refractive index of solvent; 1.333
DV value; 0.0150 to 0.0700
Transmittance (TR); 0.700 to 0.950

(Average Particle Size D50)

The fine particle compound (a1), the plastic powder (a2), and the composite aggregate particles are each subjected to the above measurement, and the particle size at which the volume-based cumulative distribution obtained by the particle size distribution measurement becomes 50% is taken as the average particle size D50 of each of these.

(Proportion of 40 µm or Smaller Particles)

The proportion of 40 µm or smaller particles in the composite aggregate particles is determined from the volume-based cumulative distribution obtained by the particle size distribution measurement. The composite aggregate particles of the present embodiment include 40 µm or smaller particles at preferably 15% by volume or less, more preferably 10% by volume or less in the volume particle size distribution. When the proportion satisfies the above range, it is easy to diminish the elution of components derived from the fine particle compound. In particular, when an aluminosilicate compound is used as the fine particle compound (a1), the above effect is exerted. The proportion can be adjusted to be in the above range by decreasing 10 μm or smaller particles of the fine particle compound (a1) by a cyclone and the like (for example, to 10% by volume or less) or sieving, the composite aggregate particles using a sieving apparatus of an appropriate size.

(Pore Volume)

The pore volume per mass is measured using a mercury press-in method pore volume measuring instrument ("MicroActive AutoPore V 9600" manufactured by Micromeritics Instrument Corporation). The mercury pressure ranges from 0.10 psia to 61000.00 psia.

The composite aggregate particles of the present invention as described above can be suitably used as a heavy metal removing agent.

The composite aggregate particles of the present embodiment can be used as an adsorbent in the form of granules as they are, but are preferably used as an adsorbent by being mixed with activated carbon as will be described later.

<Adsorbent, Molded Body, and Water Purifier>

The adsorbent of the present embodiment contains the above-described composite aggregate particles and activated carbon.

The activated carbon is only required to be activated carbon obtained by carbonizing and activating a carbonaceous material, and is preferably activated carbon having a specific surface area of several hundred $m^2/g$ or more.

Examples of the carbonaceous material include plant-based materials such as wood, sawdust, charcoal, fruit shells such as coconut shell and walnut shell, fruit seeds, pulp-making by-products, lignin, and molasses, mineral-based materials such as peat, grass charcoal, sub-charcoal, brown coal, bituminous coal, smokeless coal, coke, coal tar, coal pitch, petroleum distillation residue, and petroleum pitch, synthetic materials such as phenol, Saran, and acrylic resin, and natural materials such as recycled fiber (rayon). Among these, it is preferable to use coconut shell activated carbon of a plant-based material.

When powdered or granular activated carbon is used, the size thereof is preferably 75 μm to 2.8 mm (200 mesh to 7 mesh), more preferably 100 μm to 1.4 mm (150 mesh to 12 mesh) from the viewpoints of workability, contact efficiency with water, water passing resistance, and the like. When fibrous activated carbon is used, it is desirable to use fibrous activated carbon cut into about 1 to 5 mm front the viewpoint of moldability, and it is preferable to use fibrous activated carbon having an iodine adsorption amount of 1200 to 3000 mg/g from the viewpoint of removability of free chlorine.

In the adsorbent of the present embodiment, the proportion of the composite aggregate particles in the adsorbent is preferably 1 mass % or more and preferably 50 mass % or less, more preferably 20 mass % or less. The adsorbent is obtained by mixing the above-described composite aggregate particles and activated carbon. The mixing method is not particularly limited, and a known method can be adopted. This mixture (adsorbent) can be used as a water purification material by being filled as it is, but can also be used as a molded body in the form of a cartridge by being further pressurized and molded. When the mixture (adsorbent) is formed into a molded body, a binder for molding and a non-woven fabric for maintaining the shape of molded body may be used as appropriate. Silver impregnated activated carbon or silver zeolite can also be added to the mixture of the composite aggregate particles and the activated carbon in order to impart antibacterial properties.

The adsorbent of the present embodiment preferably contains composite aggregate particles in which the amount of aluminum eluted after 1 minute is less than 100 ppb when the amount of composite aggregate particles in the adsorbent is set to 2 mass % and filtration is performed at a space velocity (SV) of 2300 $hr^{-1}$.

The water passing conditions are not particularly limited when the adsorbent is filled in a container (column) and the container (column) is used as a water purifier, but water is allowed to pass through the water purifier at a space velocity (SV) of, for example, 50 to 4000 $hr^{-1}$ so that the pressure loss does not become too large. The adsorbent of the present embodiment has a high adsorption rate and thus exerts the performance at a SV of 100 $hr^{-1}$ or more and further a flow velocity of 1000 $hr^{-1}$ or more as well, and the water purifier column can be thus significantly miniaturized.

According to the present embodiment, it is possible to provide a water purifier having lead ion removing performance of 80 liters or more per 1 ml of cartridge at a space velocity of 1000 $hr^{-1}$.

The adsorbent, molded body, and water purifier of the present embodiment have low liquid passing resistance and significantly excellent lead ion removing performance while maintaining the performance of removing free chlorine, THM heavy metals and the like in a well-balanced manner, and are thus extremely useful for industrial use.

As described above, the present specification discloses various aspects of technology, of which the main technologies are summarized below.

The composite aggregate particles according to an aspect of the present invention are composite aggregate particles which contain a fine particle compound (a1) containing at least either of an amorphous titanosilicate compound or an aluminosilicate compound, and a plastic powder (a2), wherein the plastic powder (a2) is attached to at least a part of a surface of the fine particle compound (a1), and a pore volume and an average particle size D50 of the composite aggregate particles satisfy the following formula.

Pore volume (ml/g)≥0.0010×D50 (μm)+1.60.

Such a configuration makes it possible to provide composite aggregate particles that have low liquid passing resistance and are capable of efficiently removing lead ion while maintaining the performance of removing free chlorine, THM, heavy metals and the like in a well-balanced manner.

It is preferable that the average particle size D50 of the composite aggregate particles is 50 μm to 1 mm. It is considered that this provides superior properties in terms of pressure loss and handleability.

In the composite aggregate particles, it is preferable that the content of the plastic powder (a2) is 3 mass % or more and 40 mass % or less. This provides an advantage that the shape of aggregate particles is stabilized as well as the removing performance is maintained.

In the composite aggregate particles, it is preferable that the average particle size D50 of the fine particle compound (a1) is 200 μm or less. This makes it possible to further increase the adsorption rate when the composite aggregate particles are used as an adsorbent.

In the composite aggregate particles, it is preferable that the plastic powder (a2) is a thermoplastic resin. This provides an advantage that aggregate particles are obtained by heating.

In this case, in the composite aggregate particles, it is preferable that the melt flow rate of the thermoplastic resin is 0.02 g/10 minutes or more and 40 g/10 minutes or less. When the melt flow rate is in this range, it is considered that the fine particle compound is easily attached to the surface of the thermoplastic resin and the thermoplastic resin also easily retains the shape of particles.

It is preferable that the thermoplastic resin is polyethylene. It is considered that this makes it possible to more reliably obtain the above effect.

The adsorbent according to another aspect of the present invention contains the above-described composite aggregate particles and activated carbon.

The present invention also includes a molded body containing the adsorbent and a water purifier including the adsorbent.

It is preferable that the water purifier according to the present invention has lead ion removing performance of 80 liters or more per 1 ml of cartridge at a space velocity SV of 1000 hr$^{-1}$.

EXAMPLES

Hereinafter, the present invention will be described in more detail based on Examples. However, the present invention is not limited by the following Examples at all, The average particle size D50 and pore volume in the following tests are the values measured by the methods and analytical conditions described above.

Examples 1 to 5

Uniformly mixed were 1 kg of amorphous titanosilicate compound ("ATS" manufactured by BASF SE, average particle size: 20 μm) as a fine particle compound and 75 g of polyethylene (PE) powder ("FLO-THENE" UF-1.51N manufactured by SUMITOMO SEIKA CHEMICALS CO., LTD., MFR: 1.4 g/10 minutes, melting point: 110° C., average particle size: 20 μm) as a plastic powder. This mixture was heated at a temperature of 160° C. for 1 hour using a heating dryer and then crushed using a crushing machine while maintaining the temperature at 60° C. or higher. Thereafter, the crushed product was cooled to room temperature and sieving was performed using a sieving machine. By changing the mesh size, composite aggregate particles of Examples 1 to 5 having average particle sizes D50 and pore volumes as presented in Table 1 were obtained. The volatile matter contents (PE content) were all 19%.

Examples 6 to 8

Uniformly mixed were 1 kg of aluminosilicate compound ("Zeomic" LH210N manufactured by Sinanen Zeomic Co., Ltd., average particle size: 32 μm) as a fine particle compound and 75 g of polyethylene (PE) powder ("FLO-THENE" UF-1.5N manufactured by SUMITOMO SEIKA CHEMICALS CO., LTD., MFR: 1.4 g/10 minutes, melting point: 110° C., average particle size: 20 μm) as a plastic powder. This mixture was heated at a temperature of 160° C. for 1 hour using a heating dryer and then crushed using a crushing machine while maintaining the temperature at 60° C. or higher. Thereafter, the crushed product was cooled to room temperature and sieving was performed using a sieving machine. By changing the mesh size, composite aggregate particles of Examples 6 to 8 having average particle sizes D50 and pore volumes as presented in Table 1 were obtained. The volatile matter contents (PE content) were all 19%.

Comparative Examples 1 to 3

Composite aggregate particles of Comparative Examples 1 to 3 were obtained in the same manner as in Examples 1 to 3 except that a mixture of a fine particle compound and polyethylene powder was heated at a temperature of 160° C. for 1 hour using a heating dryer and cooled to room temperature and then sieving was performed in the production of composite aggregate particles.

<Evaluation Test>

An adsorbent of each of Examples and Comparative Examples was obtained by uniformly mixing 1.4 g of the composite aggregate particles of each of Examples and Comparative Examples thus obtained and 26.6 g of granular activated carbon ("KURARAY COAL" GW60/150 (particle size: 0.25 mm to 0.1 mm, specific surface area: 800 m$^2$/g) or GW48/100 (particle size: 0.3 mm to 0.15 mm, specific surface area: 800 m$^2$/g) manufactured by KURARAY CO., LTD.).

With regard to the removal rate of lead ion, each adsorbent obtained above was filled in a 60 ml column, raw water containing soluble lead at 50 ppb (lead nitrate was added to adjust the lead ion concentration to 50 ppb) was allowed to pass through the column at a flow velocity of 1.0 liter (L)/min (SV: 1000 hr$^{-1}$), and the removal rate was calculated from the lead ion concentration.

The lead ion removing performance was evaluated by determining the amount of liquid passing (L) in which the removal rate of lead ion was 80% and the amount of liquid passing (L/ml) per unit volume of the adsorbent.

The results are presented in Table 1, respectively.

TABLE 1

| | Composite aggregate particles | | | | | | Evaluation | | | | |
|---|---|---|---|---|---|---|---|---|---|---|---|
| | Compound | | | | | | Adsorbent | | | | Lead ion |
| | ratio (wt) of fine particle compound (a1)/ plastic powder (a2) | Volatile matter content (a2 content) % | Calculation | | | Compound ratio (wt) of composite aggregate particles/ activated carbon | | | | removing performance | |
| | | | Average particle size D50 um | Pore volume ml/g | 0.0010 × D50 + 1.60 | Pore volume ≥ 0.0010 × D50 + 1.60 | Activated carbon | | Volume ml | SV /hr | Liquid passing amount L | Liquid passing amount per adsorbent L/ml |
| Example 1 | 93/7 | 19 | 127 | 1.90 | 1.73 | met | GW60/150 | 10/90 | 60 | 1000 | 7000 | 117 |
| Example 2 | 93/7 | 19 | 190 | 1.86 | 1.79 | met | GW60/150 | 10/90 | 60 | 1000 | 6800 | 113 |
| Example 3 | 93/7 | 19 | 228 | 2.25 | 1.83 | met | GW48/100 | 10/90 | 60 | 1000 | 6500 | 108 |
| Example 4 | 93/7 | 19 | 247 | 2.07 | 1.85 | met | GW48/100 | 10/90 | 60 | 1000 | 6200 | 103 |

TABLE 1-continued

| | Composite aggregate particles | | | | | | Adsorbent | | Evaluation | | | |
|---|---|---|---|---|---|---|---|---|---|---|---|---|
| | Compound ratio (wt) of fine particle compound (a1)/ plastic powder (a2) | Volatile matter content (a2 content) % | Average particle size D50 um | Pore volume ml/g | Calculation formula | | | Compound ratio (wt) of composite aggregate particles/ carbon activated | | | Lead ion removing performance | |
| | | | | | 0.0010 × D50 + 1.60 | Pore volume ≥ 0.0010 × D50 + 1.60 | Activated carbon | | Volume ml | SV /hr | Liquid passing amount L | Liquid passing amount per adsorbent L/ml |
| Example 5 | 93/7 | 19 | 291 | 2.20 | 1.89 | met | GW48/100 | 10/90 | 60 | 1000 | 6300 | 105 |
| Example 6 | 93/7 | 19 | 135 | 2.80 | 1.73 | met | GW60/150 | 10/90 | 60 | 1000 | 8500 | 142 |
| Example 7 | 93/7 | 19 | 200 | 3.04 | 1.80 | met | GW60/150 | 10/90 | 60 | 1000 | 8500 | 142 |
| Example 8 | 93/7 | 19 | 337 | 3.33 | 1.94 | met | GW48/100 | 10/90 | 60 | 1000 | 8000 | 133 |
| Comparative Example 1 | 93/7 | 19 | 109 | 1.63 | 1.71 | not met | GW60/150 | 10/90 | 60 | 1000 | 3900 | 65 |
| Comparative Example 2 | 93/7 | 19 | 177 | 1.73 | 1.78 | not met | GW60/150 | 10/90 | 60 | 1000 | 3800 | 63 |
| Comparative Example 3 | 93/7 | 19 | 288 | 1.83 | 1.89 | not met | GW48/100 | 10/90 | 60 | 1000 | 3500 | 58 |

<Discussion>

From the results in Table 1, it was confirmed that the adsorbents, in which the composite aggregate particles of Examples were used, exhibited significantly excellent lead removing performance.

On the other hand, the adsorbents, in which the composite aggregate particles of Comparative Examples not satisfying the constituents of the present invention were used, exhibited lead removing performance inferior to that in Examples.

From the above results, it is indicated that the use of the composite aggregate particles of the present invention makes it possible to provide an adsorbent, a water purification material, and the like that can maintain significantly excellent lead removing performance for a long period of time.

Example 9

Uniformly mixed were 1 kg of aluminosilicate compound ("Zeomic" LH210N manufactured by Sinanen Zeomic Co., Ltd., average particle size: 32 μm) (aluminosilicate 1) as a fine particle compound and 110 g of polyethylene (PE) powder ("FLO-THENE" UF-1.5N manufactured by SUMITOMO SEIKA CHEMICALS CO., LTD., MFR: 1.4 g/10 minutes, melting point: 110° C., average particle size: 20 μm) as a plastic powder. This mixture was heated at a temperature of 160° C. for 1 hour using a heating dryer and then crushed using a crushing machine while maintaining the temperature at 60° C. or higher. Thereafter, the crushed product was cooled to room temperature and sieving was performed using a sieving machine. The volatile matter content (PE content) was 23%.

The composite aggregate fine particles thus obtained were used, and an adsorbent was obtained by uniformly mixing 0.64 g of the composite aggregate particles thus obtained and 32.3 g of granular activated carbon ("KURARAY COAL" GW60/150 manufactured by KURARAY CO., LTD., particle size: 0.25 mm to 0.1 mm, specific surface area: 800 m²/g).

The proportion of 40 μm or smaller particles in the composite aggregate particles was calculated from the above-described (particle size distribution) measurement results.

With regard to the removal rate of lead ion, each adsorbent was filled in a 60 ml column, raw water containing soluble lead at 50 ppb (lead nitrate was added to adjust the lead ion concentration to 50 ppb) was allowed to pass through the column at a flow velocity of 2.3 liters (L)/min (SV: 2300 hr$^{-1}$) in the same manner as in Example 1, and the removal rate was calculated from the lead ion concentration.

The lead ion removing performance was also evaluated by the amount of liquid passing in which the removal rate of lead ion was 80% in the same manner as in Example 1.

The amount of aluminum elated was determined from the difference between the aluminum concentration in the raw water and the aluminum concentration after 1 minute of water passing when water was allowed to pass under the above conditions.

The results are presented in Table 2.

Examples 10 to 12

Composite aggregate particles were obtained in the same manner as in Example 9 except that an aluminosilicate compound ("Zeomic" LH210N manufactured by Sinanen Zeomic Co., Ltd., average particle size: 30 μm) was crushed using a ball mill and a crushed product (aluminosilicate 2) in which the average particle size was 30 μm and the proportion of 10 μm or less particles by the volume particle size distribution was 6 volume %, a crushed product (aluminosilicate 3) in which the average particle size was 27 μm and the proportion of 10 μm or less particles by the volume particle size distribution was 13 volume %, and a crushed product (aluminosilicate 4) in which the average particle size was 24 μm and the proportion of 10 μm or less particles by the volume particle size distribution was 21 volume % were each used as a fine particle compound. The volatile matter content (PE content) was 23%. And adsorbents were obtained in the same manner as in Example 9 using the obtained composite aggregate fine particles. The lead ion removing performance and the amount of aluminum eluted were measured in the same manner as in Example 9. The results are presented in Table 2.

TABLE 2

| | Fine particle compound (a1) | | Composite aggregate particles | | | | | | |
|---|---|---|---|---|---|---|---|---|---|
| | | Average particle size um | Volume percentage of 10 μm or smaller particles | Compound ratio (wt) of fine particle compound (a1)/ plastic powder (a2) | Volatile matter (a2 content) % | Average particle size D50 um | Pore volume ml/g | Volume percentage of 40 μm or smaller particles | Calculation formula 0.0010 × D50 + 1.60 |
| Example 9 | Aluminosilicate 1 | 32 | 0 | 90/10 | 23 | 201 | 2.73 | 0 | 1.80 |
| Example 10 | Aluminosilicate 2 | 30 | 6 | 90/10 | 23 | 145 | 2.53 | 4 | 1.74 |
| Example 11 | Aluminosilicate 3 | 27 | 13 | 90/10 | 23 | 119 | 2.41 | 4 | 1.72 |
| Example 12 | Aluminosilicate 4 | 24 | 21 | 90/10 | 23 | 101 | 2.39 | 11 | 1.70 |

| | | Adsorbent | | Evaluation | | | | |
|---|---|---|---|---|---|---|---|---|
| | Calculation formula Pore volume ≥ 0.0010 × D50 +1.60 | Activated carbon | Compound ratio (wt) of composite aggregate particles/ activated carbon | Volume ml | SV /hr | Amount of aluminum eluted after 1 minute ppb | Lead ion removing performance | |
| | | | | | | | Liquid passing amount L | Liquid passing amount per adsorbent L/ml |
| Example 9 | met | GW60/150 | 2/98 | 60 | 2300 | 3 | 150 | 2.5 |
| Example 10 | met | GW60/150 | 2/98 | 60 | 2300 | 19 | 200 | 3.3 |
| Example 11 | met | GW60/150 | 2/98 | 60 | 2300 | 35 | 210 | 3.5 |
| Example 12 | met | GW60/150 | 2/98 | 60 | 2300 | 93 | 200 | 3.3 |

<Discussion>

From the results in Table 2, it is indicated that the composite aggregate particles of the present invention can suppress the elution of components derived from fine particle compounds as well as exhibit the lead removing performance in a case where the proportion of 40 μm or smaller particles is equal to or less than a certain value in the volume particle, size distribution.

This application is based on Japanese Patent Application No. 2019-65652 filed on Mar. 29, 2019, the contents of which are included in the present application.

In order to express the present invention, the present invention described above appropriately and sufficiently through the embodiments with reference to specific examples and the like. However, it Should be recognized by those skilled in the art that changes and/or improvements of the above-described embodiments can be readily made. Accordingly, changes or improvements made by those skilled in the art shall be construed as being included in the scope of the claims unless otherwise the changes or improvements are at the level which departs from the scope of the appended claims.

INDUSTRIAL APPLICABILITY

The present invention has a wide range of industrial applicability in technical fields of adsorbents, water purification, filters and the like.

The invention claimed is:

1. Composite aggregate particles, comprising:
a fine particle compound (a1) containing at least either an amorphous titanosilicate compound or an aluminosilicate compound; and
a plastic powder (a2),
wherein
the plastic powder (a2) is attached to at least a part of a surface of the fine particle compound (a1), and
a pore volume and an average particle size D50 of the composite aggregate particles satisfy the following formula:

pore volume (ml/g)≥0.0010×D50 (μm)+1.60.

2. The composite aggregate particles according to claim 1, which have an average particle size D50 of 50 μm to 1 mm.

3. An adsorbent, comprising:
the composite aggregate particles according to claim 2 and activated carbon.

4. The composite aggregate particles according to claim 1, wherein a content of the plastic powder (a2) is 3 mass % or more and 40 mass % or less.

5. An adsorbent, comprising:
the composite aggregate particles according to claim 4 and activated carbon.

6. The composite aggregate particles according to claim 1, wherein an average particle size D50 of the fine particle compound (a1) is 200 μm or less.

7. An adsorbent, comprising:
the composite aggregate particles according to claim 6 and activated carbon.

8. The composite aggregate particles according to claim 1, wherein the plastic powder (a2) is a thermoplastic resin.

9. The composite aggregate particles according to claim 8, wherein a melt flow rate of the thermoplastic resin is 0.02 g/10 minutes or more and 40 g/10 minutes or less.

10. An adsorbent, comprising:
the composite aggregate particles according to claim 9 and activated carbon.

11. The composite aggregate particles according to claim 8, wherein the thermoplastic resin is polyethylene.

12. An adsorbent, comprising:
the composite aggregate particles according to claim 11 and activated carbon.

13. An adsorbent, comprising:
the composite aggregate particles according to claim 8 and activated carbon.

14. An adsorbent, comprising:
the composite aggregate particles according to claim 1 and activated carbon.

15. A molded body, comprising:
the adsorbent according to claim 14.

16. A water purifier, comprising:
the adsorbent according to claim 14.

17. The water purifier according to claim 16, which has lead ion removing performance of 80 liters or more per 1 ml of cartridge at a space velocity of 1000 $hr^{-1}$.

* * * * *